(12) United States Patent
Krishnamurthy et al.

(10) Patent No.: US 8,886,967 B2
(45) Date of Patent: Nov. 11, 2014

(54) ADAPTIVE VOLTAGE POSITIONING LOGIC FOR VOLTAGE REGULATORS

(75) Inventors: Harish Krishnamurthy, Hillsboro, OR (US); Annabelle Pratt, Hillsboro, OR (US); Tomm Aldridge, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 12/618,899

(22) Filed: Nov. 16, 2009

(65) Prior Publication Data
US 2011/0119513 A1    May 19, 2011

(51) Int. Cl.
*G06F 1/00* (2006.01)
*G06F 1/28* (2006.01)
*G06F 1/26* (2006.01)

(52) U.S. Cl.
CPC ... *G06F 1/28* (2013.01); *G06F 1/26* (2013.01)
USPC .......................................................... 713/300

(58) Field of Classification Search
CPC ................ G06F 1/28; G06F 1/26; G06F 1/32
USPC .......................................................... 713/300
See application file for complete search history.

(56) References Cited

U.S. PATENT DOCUMENTS

| | | | |
|---|---|---|---|
| 7,161,335 B2* | 1/2007 | Wei et al. | 323/266 |
| 7,605,572 B2* | 10/2009 | Xu et al. | 323/274 |
| 7,656,140 B2* | 2/2010 | Marino et al. | 323/282 |
| 7,782,039 B1* | 8/2010 | He | 323/288 |
| 7,928,779 B2* | 4/2011 | Song | 327/156 |
| 2002/0041335 A1* | 4/2002 | Taraci et al. | 348/511 |
| 2005/0149770 A1* | 7/2005 | Koertzen et al. | 713/300 |
| 2008/0024100 A1* | 1/2008 | Huang et al. | 323/282 |
| 2008/0122412 A1* | 5/2008 | Burton et al. | 323/234 |
| 2008/0297067 A1* | 12/2008 | Wang et al. | 315/294 |
| 2009/0230930 A1* | 9/2009 | Jain et al. | 323/234 |
| 2009/0261795 A1* | 10/2009 | Tang et al. | 323/283 |
| 2010/0188062 A1* | 7/2010 | Candage et al. | 323/271 |

OTHER PUBLICATIONS

Pan, S. et al., "A Non-Linear Multi-Mode Control Method to Improve the Transient Performance of Voltage Regulators", IEEE, International Telecommunications Energy Conference, Sep. 14-18, 2008, 6 pages.

* cited by examiner

*Primary Examiner* — Mohammed Rehman
(74) *Attorney, Agent, or Firm* — Jordan IP Law, LLC

(57) ABSTRACT

A voltage regulator may include a voltage converter to generate an output voltage based on an input voltage and a control signal. The voltage regulator may also include a control loop to adjust the control signal based on a magnitude of an error between a digital representation of the output voltage and an adaptive digital reference voltage. Additionally, the voltage regulator can have adaptive voltage positioning logic to modify the adaptive digital reference voltage based on the magnitude of the error.

17 Claims, 5 Drawing Sheets

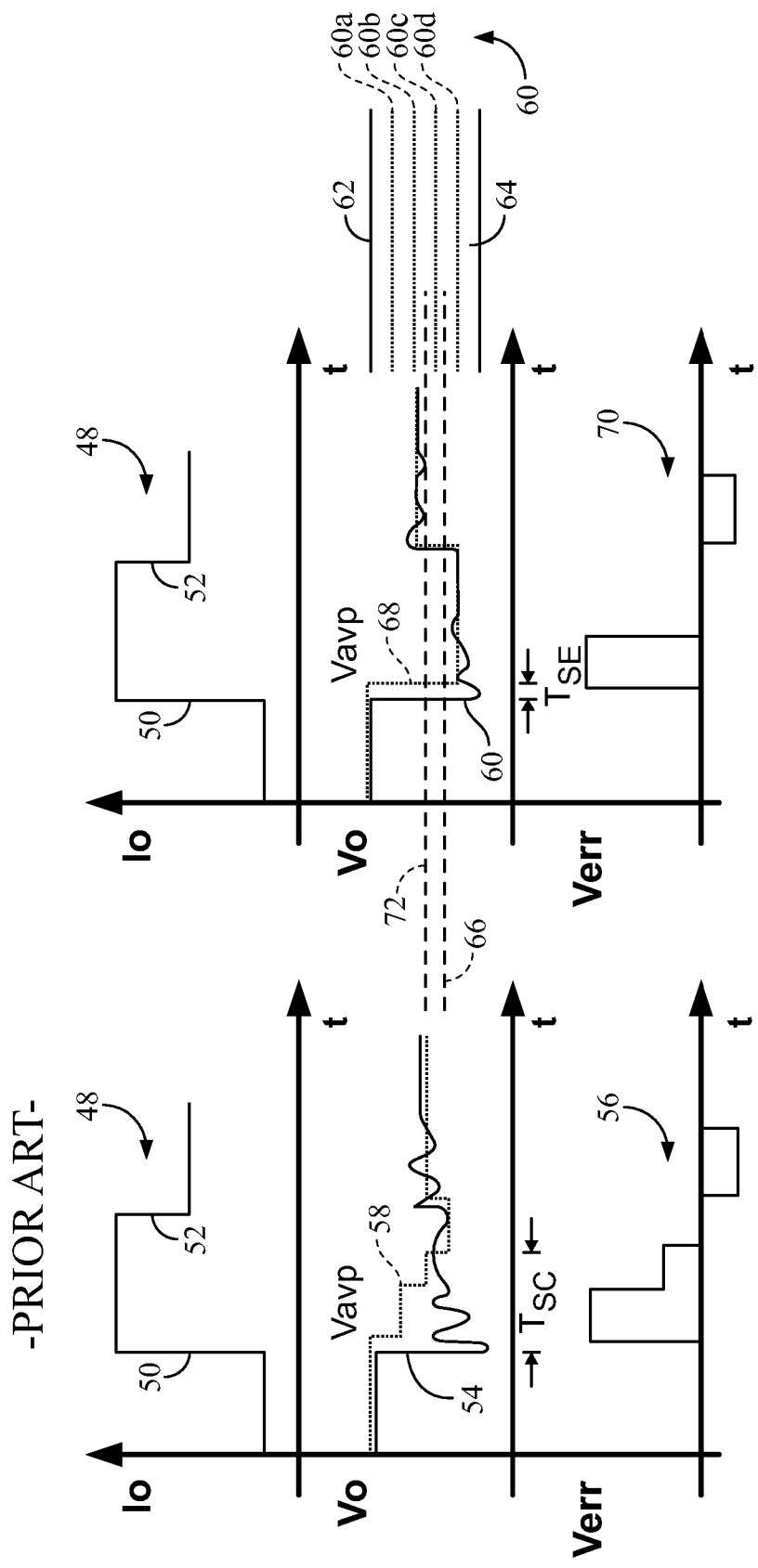

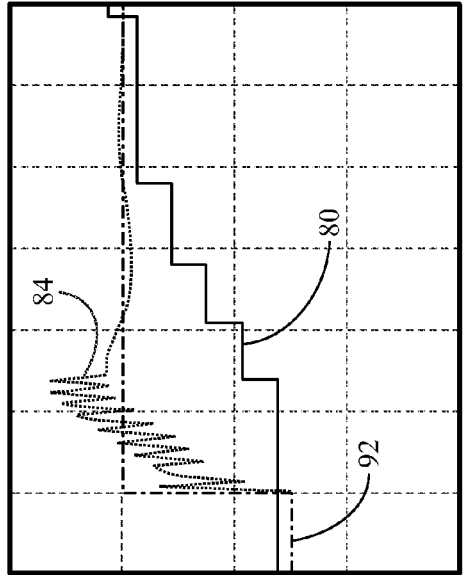
FIG. 4A -PRIOR ART-
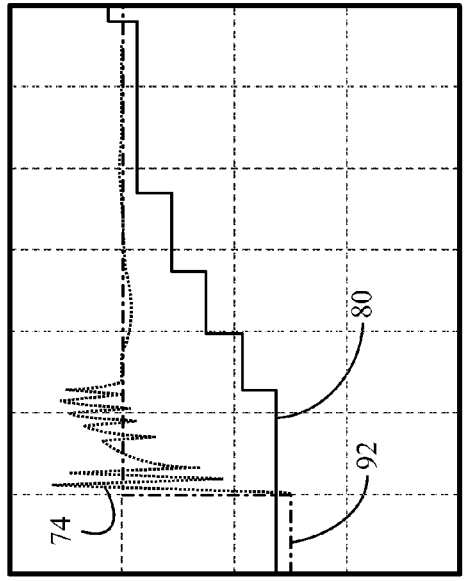
FIG. 4B

ADAPTIVE VOLTAGE POSITIONING LOGIC FOR VOLTAGE REGULATORS

BACKGROUND

1. Technical Field

Embodiments of the present application generally relate to voltage regulation. In particular, embodiments may relate to sensorless adaptive voltage positioning techniques for voltage regulators.

2. Discussion

Voltage regulators can be used to maintain a desired voltage level in a wide variety of electronic applications. In one approach, a voltage regulator may employ an adaptive voltage positioning loop, which might sense load current, convert the sensed current to a digital value, adjust an internal reference voltage based on the digital value, compare the adjusted internal reference voltage to the output voltage of a voltage converter, and generate an error signal based on the comparison, where feedback control loop may use the error signal to control the voltage converter. While such an approach may be suitable in certain circumstances, a number of challenges remain. For example, the use of an additional analog to digital converter (ADC) to convert the sensed load current to a digital value may increase the cost, power consumption and area requirements of the system. Moreover, sensing load current can increase the settling time of the regulator, which may have a negative impact on performance.

BRIEF DESCRIPTION OF THE DRAWINGS

The various advantages of the embodiments of the present invention will become apparent to one skilled in the art by reading the following specification and appended claims, and by referencing the following drawings, in which:

FIG. 3A is a plot of an example of a set of voltage and current curves for a conventional adaptive voltage positioning scheme;

FIG. 3B is a plot of an example of a set of voltage and current curves for an adaptive voltage positioning scheme according to an embodiment;

FIG. 4A is a plot of an example of a set of voltage and current curves for a conventional adaptive voltage positioning scheme in a multi-phase buck converter;

FIG. 4B is a plot of an example of a set of voltage and current curves for an adaptive voltage positioning scheme in a multi-phase buck converter according to an embodiment.

DETAILED DESCRIPTION

Embodiments of the present invention can provide for a computing system having a processor core and a voltage regulator coupled to the processor core. The voltage regulator may include a voltage converter to generate an output voltage based on an input voltage and a control signal, and a control loop to adjust the control signal based on a magnitude of an error between a digital representation of the output voltage and a digital reference voltage. The voltage regulator may also include adaptive voltage positioning logic to select a discrete voltage level from a plurality of discrete voltage levels based on the magnitude of the error, and to set the digital reference voltage to the selected discrete voltage level.

Other embodiments may provide for a voltage regulator having a voltage converter, a control loop and adaptive voltage positioning logic. The voltage converter can generate an output voltage based on an input voltage and a control signal. The control loop may adjust the control signal based on a magnitude of an error between a digital representation of the output voltage and a digital reference voltage. The adaptive voltage positioning logic can modify the digital reference voltage based on the magnitude of the error.

Other embodiments can provide for a method of operating a voltage regulator in which an output voltage is generated based on an input voltage and a control signal. The control signal may be adjusted based on a magnitude of an error between a digital representation of the output voltage and a digital reference voltage. The digital reference voltage can be modified based on the magnitude of the error.

Figure 1:
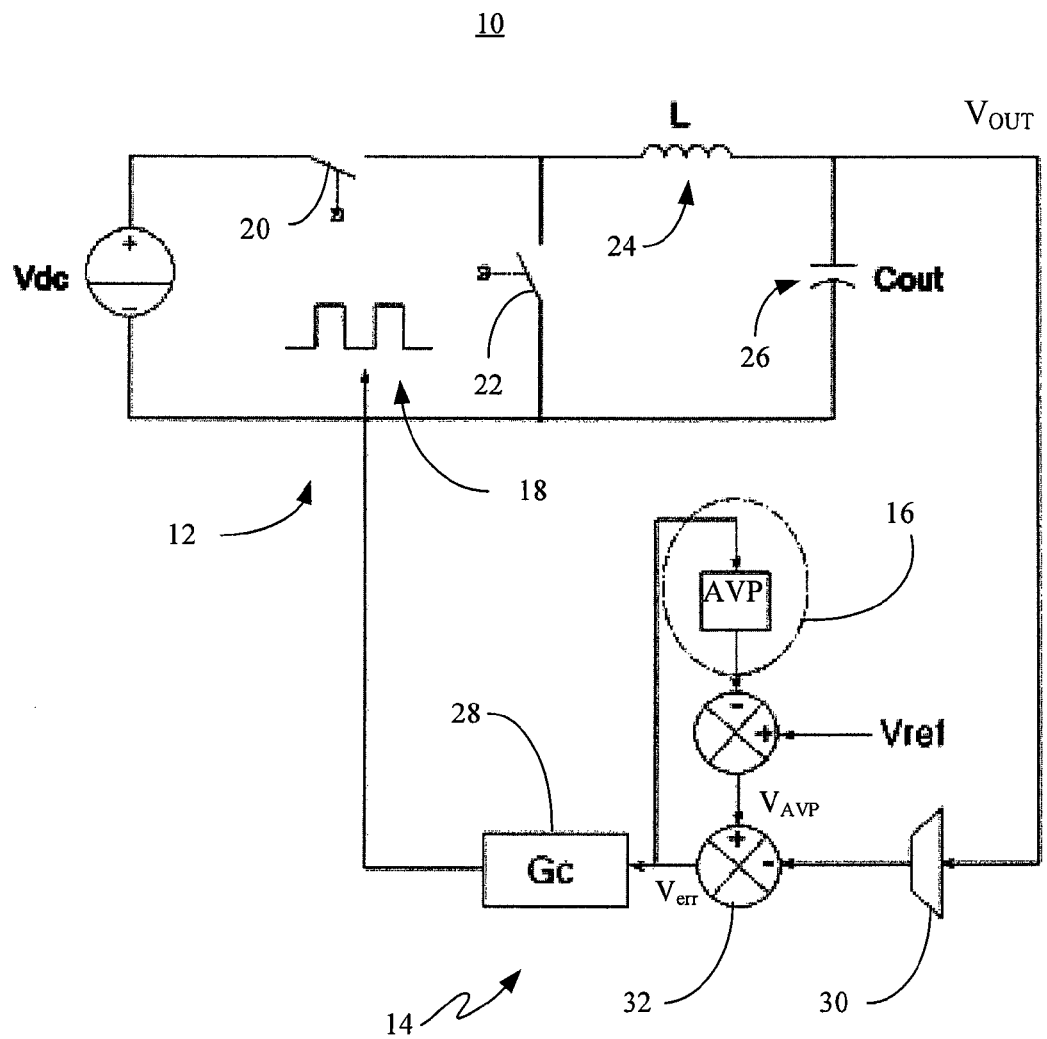
FIG. 1 is a circuit diagram of an example of a voltage regulator according to an embodiment.

FIG. 1 shows a voltage regulator having a voltage converter 12, a control loop 14 and adaptive voltage positioning logic (AVP) 16. In the illustrated example, the voltage converter 12 generates an output voltage ($V_{OUT}$) based on an input voltage (Vdc) and a control signal such as variable duty cycle pulse width modulated (PWM) signal 18. The voltage converter 12, which may be a multi-phase buck converter or any other suitable converter, can include a set of switches 20, 22 to be controlled by the signal 18, a load inductor (L) 24 and an output capacitor ($C_{out}$) 26.

The control loop 14 may adjust the control signal 18 based on the magnitude of the error (Verr) between a digital representation of the output voltage $V_{OUT}$ and an adaptive digital reference voltage $V_{AVP}$. Thus, in the illustrated example, the control loop 14 includes an analog to digital controller (ADC) 30 that digitizes the output voltage, a summer 32 that subtracts the digitized output voltage from the adaptive digital reference voltage, and a gain controller $G_c$ 28 that generates the control signal 18 based on the magnitude of the error. During regular steady state operation, the output voltage may be generally equal to the applied reference voltage so that the magnitude of the voltage error (Verr) is approximately zero.

The illustrated AVP logic 16 modifies the adaptive digital reference voltage based on the magnitude of the error. By adjusting the adaptive digital reference voltage based on the magnitude of the error, the illustrated AVP logic 16 eliminates the need for additional current sensing and ADC components. As a result, the voltage regulator 10 may have significantly lower cost, power consumption, and space requirements than conventional voltage regulators and may also demonstrate faster settling times and enhanced performance than achievable with conventional voltage regulators.

Figure 2:
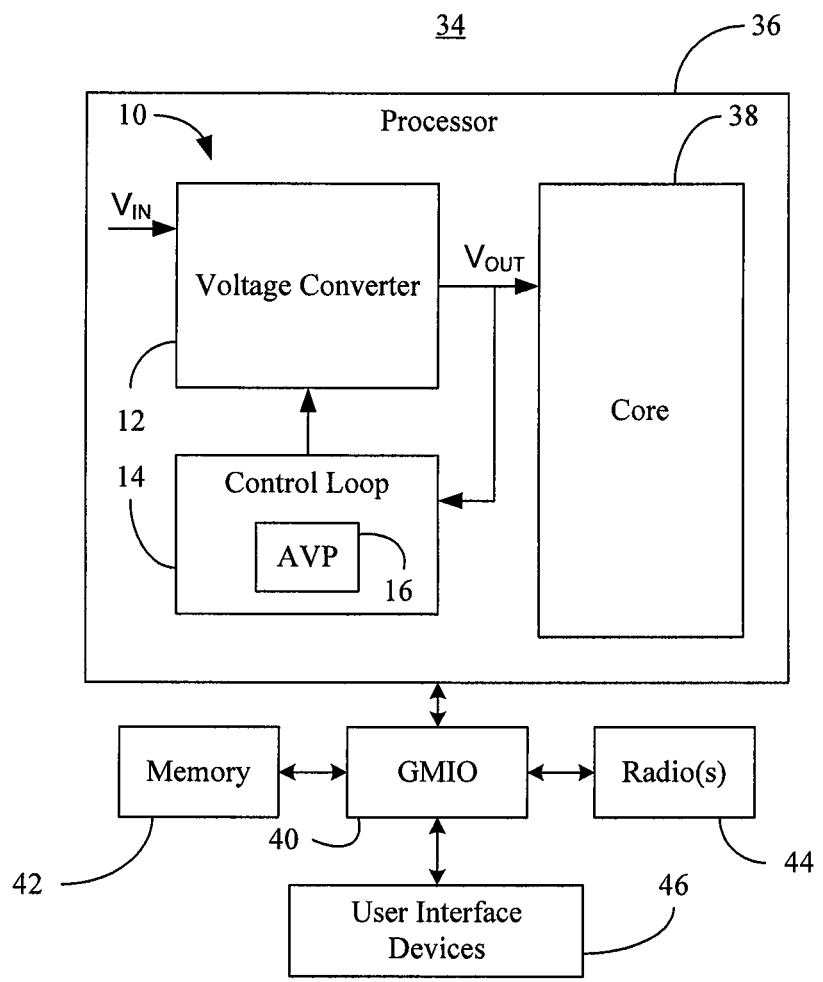
FIG. 2 is a block diagram of an example of a computing system according to an embodiment.

Turning now to FIG. 2, a computing system 34 is shown. The system 34 may be a portion of a computing platform such as a test system, design/debug tool, server, laptop, personal digital assistant (PDA), wireless smart phone, media player, imaging device, or any other suitable apparatus. The illustrated system 34 includes one or more processors 36, a graphics/memory/input/output (GMIO) control 40, memory 42, a wireless interface/radio 44, and user interface devices 46. The GMIO control 40 may include one or more blocks (e.g., chips or units within an integrated circuit) to perform various interface control functions (e.g., memory control, graphics control, I/O interface control, and the like). These circuits may be implemented on one or more separate chips and/or may be partially or wholly implemented within the processor 36. The system 34 could constitute one or more complete computing systems or alternatively, it could constitute one or more components useful within a computing system.

The memory 42 can include one or more memory blocks to provide additional read only memory (ROM) or random access memory (RAM) to the processor 36. It may be implemented with any suitable memory including but not limited to dynamic RAM (DRAM), static RAM (SRAM), flash memory, or the like. The radios 44 may wirelessly couple the processor 36 to a wireless network (not shown). The user interface devices 46 may include one or more devices such as a display, keypad, mouse, etc. to allow a user to interact with and perceive information from the system 34. The GMIO control 40, memory 42, radios 44 and/or user interface devices 46 may also include one or more voltage regulators such as the regulator 10.

In the illustrated example, the processor 36 includes one or more processing cores 38, where a DC input voltage signal/level/potential $V_{IN}$ might be obtained from a battery (not shown) or other rail source that is not directly usable by the processor core 38. Thus, the processor 36 can include a voltage regulator 10 with a converter 12 that may convert the input voltage signal into a DC output voltage signal level/potential $V_{OUT}$, which the processor core 38 can use during operation to perform various computing tasks. As already noted, a control loop 14 may adjust the control signal provided to the converter 12 based on a magnitude of the error between a digital representation of the output voltage and an adaptive digital reference voltage. In addition, AVP logic 16 may be used to modify the adaptive digital reference voltage based on the magnitude of the error.

One approach to modifying the adaptive digital reference voltage might be to select a discrete voltage level from a plurality of discrete voltage levels based on the magnitude of the error, and to set the adaptive digital reference voltage to the selected discrete voltage level. Advantages of such an approach are demonstrated in FIGS. 3A and 3B, which illustrate operation in response to step load and step unload event and/or task. In particular, an output current plot 48 shows a step load transition 50 and a step unload transition 52. In the conventional solution of FIG. 3A, the output voltage plot 54 experiences a downward spike and the error magnitude curve 56 goes positive. In the conventional approach, the adaptive digital reference voltage 58, which may track the load current via a current sensing mechanism, can gradually adjust downward in response to the load current change. As a result, the conventional settling time ($T_{sc}$) may be longer than desired.

By contrast, the output voltage plot 60 of FIG. 3B can exhibit a much shorter and enhanced settling time ($T_{se}$) due to the use of a plurality of discrete voltage levels 60 (60a-60b) (rather than using a current measurement) that may be bounded by a maximum reference voltage level 62 and a minimum reference voltage level 64. In particular, the AVP logic 16 (FIGS. 1 and 2) may set an adaptive digital reference voltage 68 to a discrete voltage level 60d in response to the change in the magnitude of the error because the discrete voltage level 60d might be the closest to a calculated ideal voltage level 66. The resulting change in the error magnitude curve 70 and in the control signal that can be applied to the voltage converter 12 (FIGS. 1 and 2) in response to the error magnitude, may cause the output voltage plot 60 to settle more quickly at/near the ideal voltage level 66. Simply put, if the error corresponds to an increase in the current demand of the load, the AVP logic may select a lower discrete voltage level in response to the error. Thus, the gain controller 28 (FIG. 1) can react to the load disturbance after a brief interval of time that may be proportional to the bandwidth of the controller. During this period of inactivity, the voltage error may take a free fall and the magnitude of error may be proportional to the load current step. Capturing this proportional change and incorporating it into the adjustment of the digital reference voltage can provide significant advantages.

If a step unload occurs as demonstrated at transition 52, the AVP logic may again select a discrete voltage level in response to the corresponding change in the error magnitude curve 70. For example, the adaptive digital reference voltage might be set to discrete voltage level 60b, which may be the closest to a calculated ideal voltage level 72. Again, the resulting change in the control signal that may be applied to the voltage converter can cause the output voltage plot 60 to settle more quickly at/near the ideal voltage level 66. By selecting a higher discrete voltage level in response to the error (rather than a measured current), the digital reference voltage can be effectively de-coupled from the current demand of the load.

The illustrated methodology can therefore divide the adaptive digital reference voltage allowable band into discrete levels, with the number of levels depending upon the resolution of the ADC 30 (FIG. 1), and move to another level based on the severity of the load disturbance in the direction depending upon whether the disturbance was a step load or a step unload operation. The severity of the disturbance can be determined by the magnitude of the change in the voltage error value. The accuracy of such an approach may depend upon the resolution of the ADC 30 (FIG. 1) and the amount of capacitance present at the output of the voltage regulator. A higher number of levels of the ADC for voltage, can result in a higher number of discrete levels in the reference voltage and greater accuracy. If the output capacitance employed is relatively large, then the contribution to the error due to the value of capacitance may be negligible, giving an even more accurate estimate of the load change.

FIGS. 4A and 4B further demonstrate enhanced operation of a voltage regulator. In the illustrated example, a 16-phase buck converter with a 7-level windowed ADC is provided with a 7.5 A load step. In the conventional approach, a load current curve 74 swings positive and an output voltage curve 76 correspondingly swings negative, where the digital reference voltage 78 generally tracks the sampled current 80. The output voltage curve 76 may not settle until region 82 in the illustrated approach. FIG. 4B shows, however, that a positive swing of a load current curve 84 and corresponding negative swing of an output voltage curve 86, can have a much sooner settling time (approximately 7-times faster) at region 88 if the digital reference voltage 90 is set to a much lower discrete voltage level when the error magnitude exhibits a large change. The resulting sampled current 80 and output current 92 profiles may not change, but significant performance, cost, power and space improvements can be realized.

Figure 5:
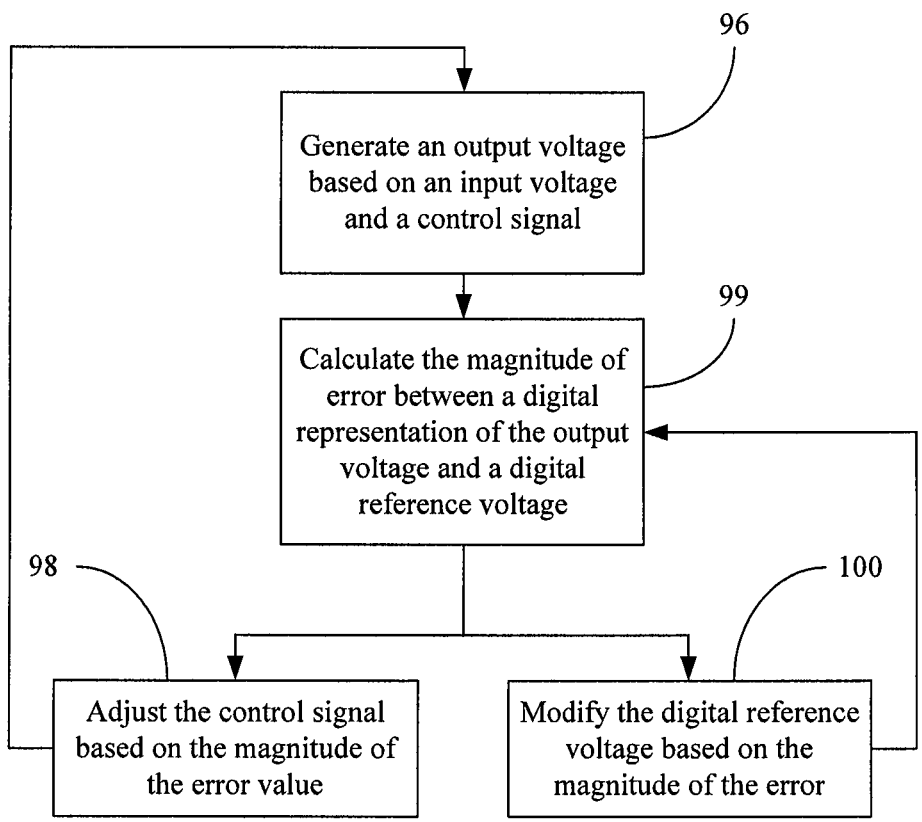
FIG. 5 is a flowchart of an example of a method of operating a voltage regulator according to an embodiment.

Turning now to FIG. 5, a method 94 of operating a voltage regulator shown. The method 94 might be implemented in fixed-functionality hardware using circuit technology such as application specific integrated circuit (ASIC), complementary metal oxide semiconductor (CMOS) or transistor-transistor logic (TTL) technology, or any combination or variation thereof. Illustrated processing block 96 provides for generating an output voltage based on an input voltage and a control signal. The magnitude of error between a digital representation of the output voltage and a digital reference voltage may be calculated at block 99, where illustrated block 98 provides for adjusting the control signal based on the magnitude of the error. In one example, the adjustment at block 98 could be implemented by selecting a discrete voltage level from a plurality of discrete voltage levels based on the magnitude of the error, and setting the digital reference voltage to the selected discrete voltage level. The plurality of discrete voltage levels might be bounded by a maximum reference voltage level and a minimum reference voltage level. Illustrated block 100 provides for modifying the digital reference voltage based on the magnitude of the error. The result may be an effective de-coupling of the digital reference voltage from measuring the current demand of the load applied to the voltage converter generating the output voltage.

Embodiments described herein are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computing system comprising:
    a processor core; and
    a voltage regulator coupled to the processor core, the voltage regulator including,
        a voltage converter to generate an output voltage based on an input voltage and a digital control signal;
        a digital control loop to adjust the digital control signal based on a magnitude of an error between a digital representation of the output voltage and a digital reference voltage; and
        digital adaptive voltage positioning logic to select a discrete voltage level from a plurality of discrete voltage levels to match a closest ideal voltage level based on the magnitude of the error, and to set the digital reference voltage to the selected discrete voltage level so that the output voltage can be quickly settled.

2. The computing system of claim 1, wherein the plurality of discrete voltage levels are bounded by a maximum reference voltage level and a minimum reference voltage level.

3. The computing system of claim 1, wherein the digital reference voltage is de-coupled from measuring a current demand of the processor core.

4. The computing system of claim 3, wherein the error is to correspond to an increase in the current demand of the processor core and the digital adaptive voltage positioning logic is to select a lower discrete voltage level in response to the error.

5. The computing system of claim 3, wherein the error is to correspond to a decrease in the current demand of the processor core and the digital adaptive voltage positioning logic is to select a higher discrete voltage level in response to the error.

6. The computing system of claim 1, wherein the digital control loop includes:
    an analog to digital converter to generate the digital representation based on the output voltage; and
    a controller to generate the digital control signal based on the magnitude of the error.

7. A voltage regulator comprising:
    a voltage converter to generate an output voltage based on an input voltage and a digital control signal;
    a digital control loop to adjust the digital control signal based on a magnitude of an error between a digital representation of the output voltage and a digital reference voltage; and
    digital adaptive voltage positioning logic to modify the digital reference voltage based on the magnitude of the error, wherein the digital adaptive voltage positioning logic is to select a discrete voltage level from a plurality of discrete voltage levels to match a closest ideal voltage level based on the magnitude of the error, and to set the digital reference voltage to the selected discrete voltage level so that the output voltage can be quickly settled.

8. The voltage regulator of claim 7, wherein the plurality of discrete voltage levels are bounded by a maximum reference voltage level and a minimum reference voltage level.

9. The voltage regulator of claim 7, wherein the digital reference voltage is de-coupled from measuring a current demand of a load applied to the voltage converter.

10. The voltage regulator of claim 9, wherein the error is to correspond to an increase in the current demand of the load applied to the voltage converter and the digital adaptive voltage positioning logic is to select a lower discrete voltage level in response to the error.

11. The voltage regulator of claim 9, wherein the error is to correspond to a decrease in the current demand of the load applied to the voltage converter and the digital adaptive voltage positioning logic is to select a higher discrete voltage level in response to the error.

12. A method of operating a voltage regulator comprising:
generating an output voltage based on an input voltage and a digital control signal;
adjusting, via a digital control loop, the digital control signal based on a magnitude of an error between a digital representation of the output voltage and a digital reference voltage; and
modifying, via digital adaptive voltage positioning logic, the digital reference voltage based on the magnitude of the error.

13. A method of operating a voltage regulator comprising:
generating an output voltage based on an input voltage and a digital control signal;
adjusting, via a digital control loop, the digital control signal based on a magnitude of an error between a digital representation of the output voltage and a digital reference voltage; and
modifying, via digital adaptive voltage positioning logic, the digital reference voltage based on the magnitude of the error,
wherein the adjusting includes:
selecting a discrete voltage level from a plurality of discrete voltage levels to match a closest ideal voltage level based on the magnitude of the error; and
setting the digital reference voltage to the selected discrete voltage level so that the output voltage can be quickly settled.

14. The method of claim 13, wherein the plurality of discrete voltage levels are bounded by a maximum reference voltage level and a minimum reference voltage level.

15. The method of claim 13, wherein the digital reference voltage is de-coupled from measuring a current demand of a load applied to a voltage converter generating the output voltage.

16. The method of claim 15, wherein the error corresponds to an increase in the current demand of the load and the selecting includes selecting a lower discrete voltage level in response to the error.

17. The method of claim 15, wherein the error corresponds to a decrease in the current demand of the load and the selecting includes selecting a higher discrete voltage level in response to the error.

* * * * *

UNITED STATES PATENT AND TRADEMARK OFFICE
CERTIFICATE OF CORRECTION

PATENT NO. : 8,886,967 B2  Page 1 of 1
APPLICATION NO. : 12/618899
DATED : November 11, 2014
INVENTOR(S) : Harish Krishnamurthy et al.

It is certified that error appears in the above-identified patent and that said Letters Patent is hereby corrected as shown below:

In the Claims

In column 7, line 4-13, In Claim 12, delete "A method of operating a voltage regulator comprising:
generating an output voltage based on an input voltage and a digital control signal;
adjusting, via a digital control loop, the digital control signal based on a magnitude of an error between a digital representation of the output voltage and a digital reference voltage; and
modifying, via digital adaptive voltage positioning logic, the digital reference voltage based on the magnitude of the error." and
insert -- The voltage regulator of claim 7, wherein the digital control loop includes:
an analog to digital converter to generate the digital representation based on the output voltage; and a controller to generate the digital control signal based on the magnitude of the error. --, therefor.

Signed and Sealed this
Seventh Day of April, 2015

Michelle K. Lee
*Director of the United States Patent and Trademark Office*